(12) United States Patent
Shibuya et al.

(10) Patent No.: US 8,319,811 B2
(45) Date of Patent: Nov. 27, 2012

(54) SCANNING LINE ALIGNED IMAGE FORMING APPARATUS

(75) Inventors: Takeshi Shibuya, Yokohama (JP); Takeshi Mochizuki, Mito (JP)

(73) Assignee: Ricoh Company, Limited, Tokyo (JP)

( * ) Notice: Subject to any disclaimer, the term of this patent is extended or adjusted under 35 U.S.C. 154(b) by 525 days.

(21) Appl. No.: 12/554,170

(22) Filed: Sep. 4, 2009

(65) Prior Publication Data

US 2010/0060711 A1 Mar. 11, 2010

(30) Foreign Application Priority Data

Sep. 5, 2008 (JP) ................................ 2008-228784
Jun. 29, 2009 (JP) ................................ 2009-154038

(51) Int. Cl.
*B41J 2/455* (2006.01)
(52) U.S. Cl. ...................................................... 347/233
(58) Field of Classification Search .................. 347/229, 347/233, 234, 240, 248, 251–254
See application file for complete search history.

(56) References Cited

U.S. PATENT DOCUMENTS

| 4,198,642 | A | 4/1980 | Gamblin | |
|---|---|---|---|---|
| 7,075,563 | B2 * | 7/2006 | Itabashi | 347/243 |
| 7,956,882 | B2 * | 6/2011 | Nakajima | 347/234 |

FOREIGN PATENT DOCUMENTS

| JP | 6-48846 | 6/1994 |
|---|---|---|
| JP | 7-209596 | 8/1995 |
| JP | 8-227048 | 9/1996 |
| JP | 2001-264657 | 9/2001 |
| JP | 2004-77714 | 3/2004 |
| JP | 2004-109680 | 4/2004 |
| JP | 2004-276532 | 10/2004 |
| JP | 2005-212223 | 8/2005 |
| JP | 2008-36992 | 2/2008 |

* cited by examiner

*Primary Examiner* — Hai C Pham
(74) *Attorney, Agent, or Firm* — Oblon, Spivak, McClelland, Maier & Neustadt, L.L.P.

(57) ABSTRACT

An image forming apparatus includes an optical scanning system that simultaneously forms a group of two scanning lines extending in a main scanning direction on a surface of a photoconductive member at a prescribed scan line interval in a sub scanning direction. An exposure intensity distribution changing device is provided to symmetrically change exposure intensity distribution of two scanning lines in the main scan direction. A group of two scanning lines formed next on the photoconductive member partially overlaps with the group previously formed with displacement of a prescribed feed pitch in the sub scanning direction so that a prescribed numbers of the two scanning lines neighboring to each other of the different groups are paired to form a prescribed number of combination scan lines. The exposure intensity distribution changing device substantially equalizes the sum of the exposure intensity of the pair of neighboring scan lines of the combination scan line at every section in the main scanning direction.

3 Claims, 14 Drawing Sheets

FIG. 10A
EXPOSURE DISTRIBUTION
FIG. 10B
INTENSITY ALLOCATION
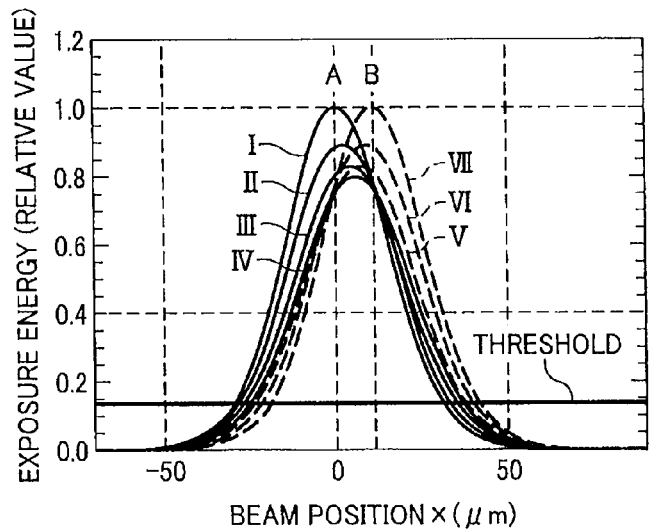
| | A | B |
|---|---|---|
| I | 1 | 0 |
| II | 0.77 | 0.15 |
| III | 0.58 | 0.29 |
| IV | 0.43 | 0.43 |
| V | 0.29 | 0.58 |
| VI | 0.15 | 0.77 |
| VII | 0 | 1 |
FIG. 11
DISPLACEMENT OF COMBINED SCANNING LINE IN RELATION TO EXPOSURE INTENSITY ALLOCATION
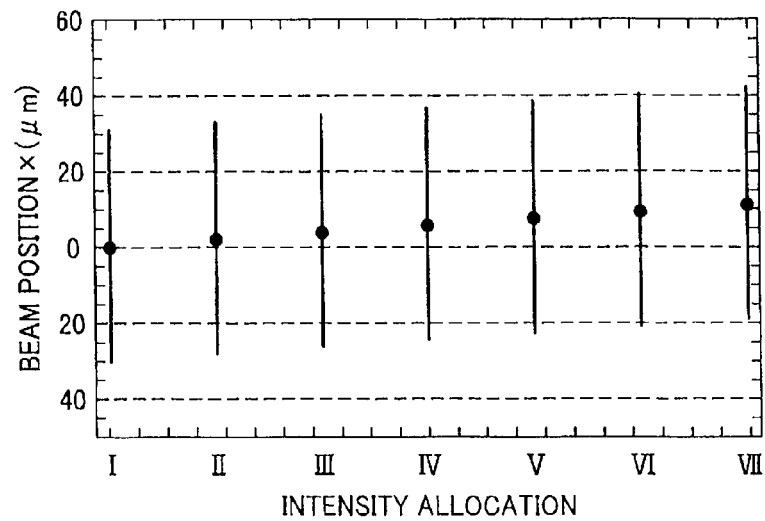

MAIN SCANNING REGION

| MAIN SCANNING REGION | EXPOSURE INTENSITY ALLOCATION | | MAIN SCANNING REGION | EXPOSURE INTENSITY ALLOCATION | |
|---|---|---|---|---|---|
| | 2-00 | 1-10 | | 2-00 | 1-10 |
| a0 | 0.29 | 0.58 | a4 | 0.43 | 0.43 |
| a1 | 0.29 | 0.58 | a5 | 0.43 | 0.43 |
| a2 | 0.43 | 0.43 | a6 | 0.29 | 0.58 |
| a3 | 0.43 | 0.43 | a7 | 0.29 | 0.58 |

| MAIN SCANNING REGION | EXPOSURE INTENSITY ALLOCATION | | MAIN SCANNING REGION | EXPOSURE INTENSITY ALLOCATION | |
|---|---|---|---|---|---|
| | 2-00 | 1-10 | | 2-00 | 1-10 |
| a0 | 1.00 | 0.00 | a4 | 0.43 | 0.43 |
| a1 | 0.77 | 0.15 | a5 | 0.58 | 0.29 |
| a2 | 0.58 | 0.29 | a6 | 0.77 | 0.15 |
| a3 | 0.43 | 0.43 | a7 | 1.00 | 0.00 |

MAIN SCANNING REGION

| MAIN SCANNING REGION | EXPOSURE INTENSITY ALLOCATION | | MAIN SCANNING REGION | EXPOSURE INTENSITY ALLOCATION | |
|---|---|---|---|---|---|
| | 2-00 | 1-10 | | 2-00 | 1-10 |
| a0 | 0.58 | 0.29 | a4 | 0.43 | 0.43 |
| a1 | 0.43 | 0.43 | a5 | 0.58 | 0.29 |
| a2 | 0.29 | 0.58 | a6 | 0.43 | 0.43 |
| a3 | 0.43 | 0.43 | a7 | 0.29 | 0.58 |

SCANNING LINE ALIGNED IMAGE FORMING APPARATUS

CROSS REFERENCE TO RELATED APPLICATIONS

This application claims priority under 35 USC §119 to Japanese Patent Application Nos. 2008-228784 and 2009-154038, filed on Sep. 5, 2008, and Jun. 29, 2009, the entire contents of which are herein incorporated by reference.

BACKGROUND OF THE INVENTION

1. Field of the Invention

The present invention relates to a monochrome or color image forming apparatus employing an electro photographic system, in particular to an image forming apparatus particularly using a laser diode array (herein after referred to as an LDA) as a light source.

2. Discussion of the Background Art

In the image forming apparatus employing an electro-photographic system, an optical scanning system is widely used, in which a laser beam is emitted to a rotating polygon mirror and is scanned and converges on a surface of a photoconductive member via an optical device, such as lens, etc., so that a latent image is formed.

Even though a market increasingly demands speeding up of an image forming apparatus, a number of rotations of the polygon mirror and beam pulses and a response speed of a photoconductive member almost reach a technical limit in the optical scanning system. Thus, to the speeding up, a research and development is directed to a new laser device capable of simultaneously emitting laser beams to increase a number of scanning lines as discussed in the Japanese Patent Application Laid Open Nos. 2001-264657 and 2004-276532.

The Japanese Patent Application Laid Open No. 2001-264657 discusses an array type laser head having plural light generation sections aligned to emit lights from one ends. The Japanese Patent Application Laid Open No. 2004-276532 discusses a laser head of a surface light generation type including plural light generation sections arranged in a matrix state.

However, these multi beam scanning causes a new problem of density unevenness called banding created in synchronism with a beam scan pitch. Thus, the Japanese Patent Application Laid Open No. 2004-77714 addresses reciprocity failure phenomenon mainly causing the banding by employing overlap scanning (i.e. skip scanning) as described in the U.S. Pat. No. 4,198,642.

Specifically, the Japanese Patent Application Laid Open No. 2004-77714 narrows a banding pitch caused by the reciprocity failure into a prescribed level hardly visually recognized distinctively.

Specifically, they attempted to improve image quality rather than to speed up by simultaneously writing an increased number of lines using multi beams.

To speed up, another problem need be resolved. In general, density of scanning lines ultimately formed in a sub scanning direction is determined by a feed pitch in the sub scanning direction and a number of scanning lines written per scanning. However, a feed pitch cannot be changed in a system where scanning line density in the sub scanning is fixed.

For example, when ten scanning lines are formed with density of 600 dpi (42.3 µm/line) per scanning, a feed pitch in the sub scanning direction is fixed to 0.423 mm (2.36 cycle/mm) (i.e., 0.0423 mm×10=0.423 mm (2.36 cycle/mm).

Further, density unevenness creates extraordinarily noticeable noise in this cycle. Even though overlap scanning effectively avoids the reciprocity failure, it is not able to narrow the feed pitch.

To increase a number of simultaneously written scanning lines and a depicting speed, the scanning lines need be uniform not being affected by the feed pitch rather than banding is removed from the visually noticeable range by narrowing the feed pitch.

As another serious problem that causes the banding, a scanning line bending is exemplified as discussed in the Japanese Patent Application Laid Open No. 7-209596.

Specifically, when a single beam is used, bending of a scanning line generally created due to a performance of the optical system in the sub scanning direction hardly becomes prominent. However, it easily becomes prominent while creating unevenness of a scanning line pitch when the multi beam is used and overlapped due to interference of the scanning line bending.

To resolve such a problem, the Japanese Patent Application Laid Open No. 8-227048 discloses non-integral overlap scanning, in which plural scanning lines are displaced being partially overlapping with each other.

In particular, it is described that a peak of a beam envelope is displaced in the sub scanning direction and a scanning line gap is changed while adjusting beam intensity of the overlapping scanning lines.

Further, the Japanese Patent Application Laid Open No. 6-48846 describes that for the purposes of relaxing precision needed in an optical skip scanning system and resolving a problem that abeam pitch permissible error becomes too strict, skip scanning is executed at a small spot interval as calculated by a prescribed formula.

Further, in the Japanese Patent Application Laid Open Nos. 2005-212223 and 2008-36992, it is described that when sequentially and simultaneously exposed sections are included, in which respective images are sequentially formed and overlapped with each other with a prescribed time delay, a difference of density in a neighboring pixel overlapping section is reduced.

Further, the Japanese Patent Application Laid Open Nos. 2004-109680 discusses a technology that executes exposure plural times by overlapping scanning lines plural times.

However, when multi beam scanning is executed by a highly integrated LDA having several dozens of channels as shown in the Japanese Patent Application Laid Open No. 8-227048 and it is attempted to resolve the problem of scanning line bending, increase of the number of scanning lines does not link with speeding up. Because, a number of scanning lines to be overlapped is the same as that of beams that executes simultaneous scanning as shown in FIG. 6.

Specifically, even though ten beams execute simultaneous scanning, if one raster is combined with ten scanning lines using the method of the Japanese Patent Application Laid Open No. 8-227048, substantially one scanning line is formed and cannot speed up by the multi beam scanning.

Further, a partially overlapping method as described in the Japanese Patent Application Laid Open No. 8-227048 raises a problem that scanning line bending in the sub scanning direction cannot be corrected.

Further, the Japanese Patent Application Laid Open No. 6-48846 increases scanning line density using a multi beam, but hardly contributes to speeding up.

Further, in a multi beam scanning as shown in the Japanese Patent Application Laid Open Nos. 2005-212223 and 2008-36992, neighboring pixels overlap with each other (i.e., overlapping beam spots) when simultaneous scanning (i.e., simultaneous exposure) is consecutively executed with a time delay such that a first scanning line comes again after the 20th scanning line in a twenty-beam LDA. As a result, a problem of reciprocity failure phenomenon is raised in that density changes in the overlapping section due to a different time response of the photoconductive member. Thus, such density change need be reduced.

Further, as described in the Japanese Patent Application Laid Open No. 2004-109680, a problem is raised in that increasing a number of scanning lines only increases an overlapping amount of the scanning lines, and hardly increases resolution or a depicting speed. Further, the primary objective is to maintain the banding within a space frequency and to suppress visibility thereof.

SUMMARY OF THE INVENTION

The present invention has been made in view of the above noted and another problems and one object of the present invention is to provide a new and noble image forming apparatus. Such a new and noble image forming apparatus includes an optical scanning system that simultaneously forms a group of two scanning lines extending in a main scanning direction on a surface of a photoconductive member at a prescribed scan line interval in a sub scanning direction. An exposure intensity distribution changing device is provided to symmetrically change exposure intensity distribution of two scanning lines in the main scan direction. A group of two scanning lines formed next on the photoconductive member partially overlaps with the group previously formed with displacement of a prescribed feed pitch in the sub scanning direction so that a prescribed numbers of the two scanning lines neighboring to each other of the different groups are paired to form a prescribed number of combination scan lines. The exposure intensity distribution changing device substantially equalizes the sum of the exposure intensity of the pair of neighboring scan lines of the combination scan line at every section in the main scanning direction.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 10A is a chart illustrating an exemplary change of exposure intensity distribution when exposure intensity is distributed in accordance with an exposure intensity distribution coefficient among scan lines;

FIG. 10B is a chart illustrating exemplary exposure intensity distribution coefficients of scanning lines;

FIG. 11 is a chart illustrating an exemplary range where a curvature of the exposure intensity distribution of FIG. 10A exceeds a threshold;

PREFERRED EMBODIMENTS OF THE PRESENT INVENTION

Figure 1:
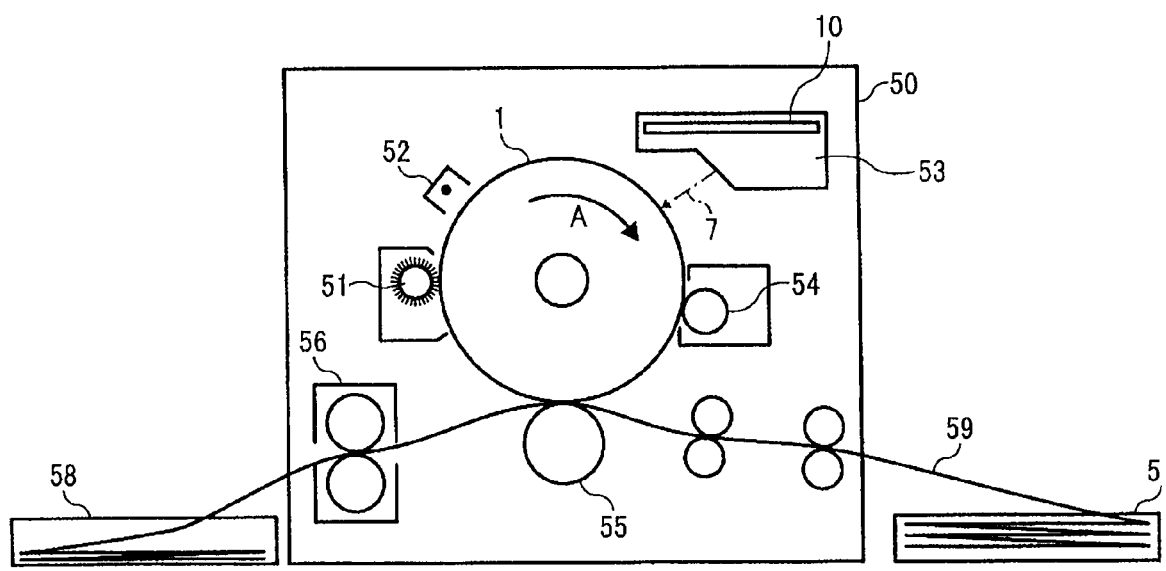
FIG. 1 is a chart schematically illustrating an exemplary image forming apparatus according one embodiment of the present invention.

Referring now to the drawings, wherein like reference numerals and marks designate identical or corresponding parts throughout several figures. The above-mentioned problem can be resolved as mentioned below. Initially, scanning lines are simultaneously formed in a block on a photoconductive member. The next scanning lines are formed in a different scanning in a block partially overlapping with the initially formed ones, so that these blocks of scanning lines are staggered. Then, two neighboring scanning lines formed at different scanning times are grouped into a pair of scanning lines. Thus, plural pairs are formed. Then, bending of the scanning line is finely adjusted by appropriately distributing exposure intensity (i.e. exposure energy) of the pair of scanning lines.

Thus, since the scanning lines formed at different scanning times always constitute the pair, banding caused due to reciprocity failure can be resolved, and bending of the scanning line in the sub scanning direction can be corrected. Further, a degree of parallelization of scanning lines formed on the photoconductive member can be maintained. As a result, banding caused by interference of bending scanning line can also be resolved.

Formation of the above-mentioned pair of scanning lines is conditioned as mentioned below. 2N number of scanning lines is initially formed in a block by single scanning of the optical scanning, such that a central interval between the scanning lines is either D+δ or D−δ, and an interval between the other portions thereof is D, wherein the following inequality is met:

$$0 \leq \delta \leq D.$$

Further, a pitch of feeding the 2N number of scanning lines as a whole in the sub scanning direction is ND.

Specifically, when a first N number of the scanning lines in the sub scanning direction among the 2N number of scanning lines are grouped as A, and N number of remaining scanning lines are grouped as B. A scanning line formed in k time scanning of the group B and a neighboring scanning line formed in (k+1) time scanning of the group A make a pair. As a result, N number of scanning lines is formed as latent images at an interval D on the photoconductive member.

A register is provided to changes exposure intensity of each of the scanning lines of the groups A and B in accordance with a position along the main scanning direction. Specifically, the register changes the exposure intensity of the scanning lines so that an interval D of the scanning lines formed on the photoconductive member as the latent images can be the same in the main scanning direction. As a result, bending of the scanning line can be corrected.

When a laser light source that emits 2N number of laser beams is constituted by a pair of LDAs each integrally including N channels of light generation elements, multipurpose use LDAs arranged at the same pitch can be used, and thereby cost thereof can be saved when mass-produced.

Now, another example capable of forming pairs of scanning lines based on 3N+1 or 3N+2 number of simultaneous scanning lines is described. When the number of lines simultaneously scanned in a block is either 3N+1 or 3N+2, a pair of scanning lines can be formed every other line by overlap scanning three times.

Specifically, among the 3N+1 number of scanning lines, the first N number thereof in the sub scanning direction is grouped as A, the next N+1 number thereof is grouped as B, and N number of remaining scanning lines is grouped as C. An interval 2D of the scanning lines in the respective groups A to C is the same to each other, while an interval between the groups A and B and that between the groups B and C are each 2D+δ/2, wherein the below described inequality is established:

$$(0 \leq \delta \leq D/2).$$

A feed pitch of feeding the whole scanning lines in the sub scanning direction is (2N+1) D. Thus, latent images are formed on the photoconductive member having N number pairs of neighboring scanning lines each formed in k time scanning of the group C and k+2 time scanning of the group A.

Then, a register is provided to change exposure intensity of each of the scanning lines in the groups A and C in accordance with a position of the main scanning direction. By appropriately adjusting a coefficient of the exposure intensity distribution set to the above-mentioned register so that the interval D of the scanning lines of the groups A to C formed on the photoconductive member as the latent images is substantially the same in the main scanning direction, bending of the scanning line can be corrected.

Similarly, when the number of lines scanned simultaneously in a bock is 3N+2, the first N+1 number thereof in the sub scanning direction is grouped as A, the next N number thereof is grouped as B, and N+1 number of remaining scanning lines is grouped as C. An interval 2D of the scanning lines in the respective groups A to C is the same to each other, while an interval between the groups A and B and that between B and C are each 2D+δ/2, wherein the below described inequality is established:

$$(0 \leq \delta \leq D/2).$$

Further, a feed pitch feeding the whole scanning lines in the sub scanning direction of is (2N+1) D. Thus, N+1 number pairs of neighboring scanning lines are formed on the photoconductive member each formed from scanning lines formed in (k) time scanning of the group C and in (k+2) time scanning of the group A. Further, a register is provided to change exposure intensity of each of the scanning lines of the groups A and C in accordance with a position of the main scanning direction. Then, by appropriately adjusting a coefficient of the exposure intensity distribution set to the above-mentioned register so that the interval D between the scanning lines in the groups A to C formed on the photoconductive member as the latent images is substantially the same in the main scanning direction, bending of the scanning line can be corrected.

When the laser light source that emits either 3N+1 or 3N+2 number of laser beams is constituted, three LDAs each including light generation elements having N+1 channels is combined while appropriately omitting channels at both ends. As a result, the same LDA can be used, and mass-production advantage can accordingly be obtained.

However, since the combination of three LDAs raises a problem of complicating both configuration and adjustment of the optical system, an apparatus can be compact and maintenance can be improved if a LDA originally includes 3N+1 or 3N+2 channels when a small number of products is manufactured.

Now, an exemplary unlimited embodiment is described with reference to FIG. 1.

As shown, an exemplary image forming apparatus 50 includes a photoconductive member drum 1 rotated in a direction as shown by an arrow A. A charger 52 applies charge to the surface of the photoconductive member drum 1 cleaned by a cleaning roller 51. A laser beam 7 is emitted from a laser unit 53 when it is tuned on in accordance with a signal transmitted from an exposure control device 10 and scans the surface of the photoconductive member drum 1. A scanning direction of the laser beam 7 is defined as a main scanning direction. The direction perpendicular to the main scanning direction, i.e. a rotational direction of the photoconductive member drum 1, is called a sub scanning direction.

The charge receiving the exposure of laser beam is removed on the photoconductive member drum 1, thereby a latent image is formed thereon. The latent image is then developed to be a toner image with toner charged in a prescribed potential opposite to the latent image by a developing roller 54.

A transfer roller 55 transfers the toner image onto a consecutive sheet 59 supplied from a sheet feed stacker 57. A fixing device 56 applies heat and pressure and thereby fixes the toner image onto the consecutive sheet 59. Then, the consecutive sheet 59 with the image is ejected onto a sheet ejection stacker 58.

Now, an exemplary optical scanning system applied to the image forming apparatus 50 is described with reference to FIG. 2. As shown, a light path is simplified by omitting a fθ lens, and mirrors folding the light path or the like. An exemplary LDA 4 is described in FIG. 4.

As shown, the laser beam 7 emitted from the LDA 4 is deflected and scanned along an axis of the photoconductive member drum 1 by a polygonal mirror 5, thereby forming beam scanning lines in a direction as shown by an arrow B on the photoconductive member drum 1.

The laser beam 7 forms a latent image on the photoconductive member drum 1 and includes twenty laser light beams simultaneously emitted from the LDA 4. However, only four laser light beams are typically illustrated in the drawing. As shown, the LDA 4 is an edge emission type having laser output terminals 6 of twenty channels aligned at substantially the same interval. A direction of the alignment of the laser output terminals 6 is inclined from a scanning direction B. To be precise, the alignment interval of the laser output terminals 6 is partially uneven as mentioned later in detail.

By decreasing an inclination θ of the alignment direction of the laser output edges 6 from the main scanning direction B, an interval of beam scanning lines 9 formed on the photoconductive member drum 1 is decreased (i.e. a pitch is narrowed). Further, the interval of the beam scanning lines 9 can be finely adjusted by adjusting the inclination θ.

Since a displacement of a write start position caused by the inclination θ can be readily corrected by adjusting a write start time, such displacement is neglected hereinafter.

Now, a problem of scan line bending that occurs in multi beam scanning to be resolved by this invention is described with reference to FIG. 4. As shown, scanning line bending is created like bobbin winding by a performance of an optical system when seven beams scanning is simultaneously executed from channels ch0 to ch6.

In the drawing, a left and right direction corresponds to the main scanning direction. An up and down direction in the drawing corresponds to the sub scanning direction. Further, by supposing that a skip scanning is executed in every other scanning line, a basic interval 2D between scanning lines is twice as much as a scanning line interval D formed on the photoconductive member drum 1 after overlap scanning is executed (i.e. when no scanning line bending exist).

Since the performance of the optical system can be locally regarded as being linear, a scanning line distanced from a central raster by the basic scanning line interval D has a displacement ε at its ends. Thus, a scanning line 24 of the ch2 has a displacement 2δ at its both ends from proper scanning positions, respectively, in relation to the scanning line 26 of the ch3 serving as a center. Similarly, the scanning line 22 of the ch1 has a displacement 4ε at its both ends from proper scanning positions 23, and the scanning line 20 of ch0 displaces at a scanning line end by 6ε from a proper scanning position 21.

Figure 4:
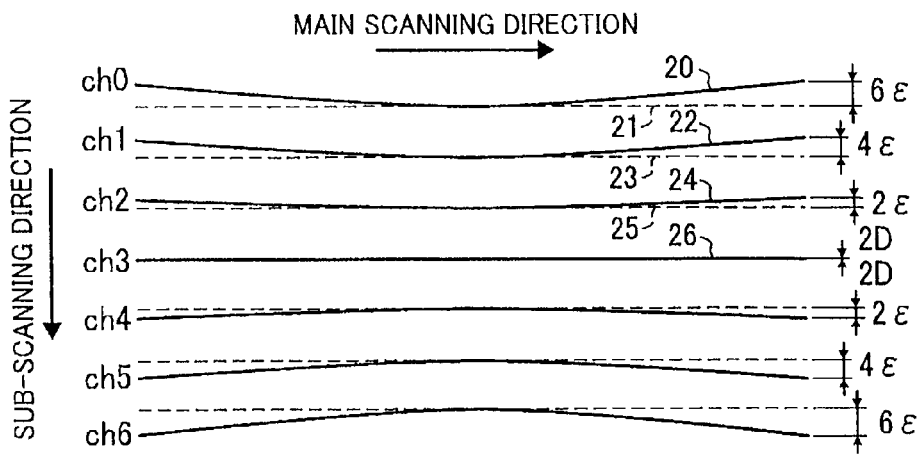
FIG. 4 is conceptual diagram illustrating an exemplary scan line bending on a photoconductive member drum when multi beam scanning is executed.

As shown, seven lines are simultaneously scanned in the typical example of FIG. 4. In general, when a number of scanning lines is represented by 2N+1, a displacement appearing on neighboring rasters at its both ends becomes 2Nε.

Now, an exemplary result of executing overlap scanning of skipping and overlapping some scanning lines with each other is described with reference to FIG. 5, in which san line images formed by the first scanning are represented as 1-0 to 1-6. Scanning line images formed by the second scanning are represented as 2-0 to 2-6. Scanning line images formed by subsequent scanning are similarly represented.

Figure 5:
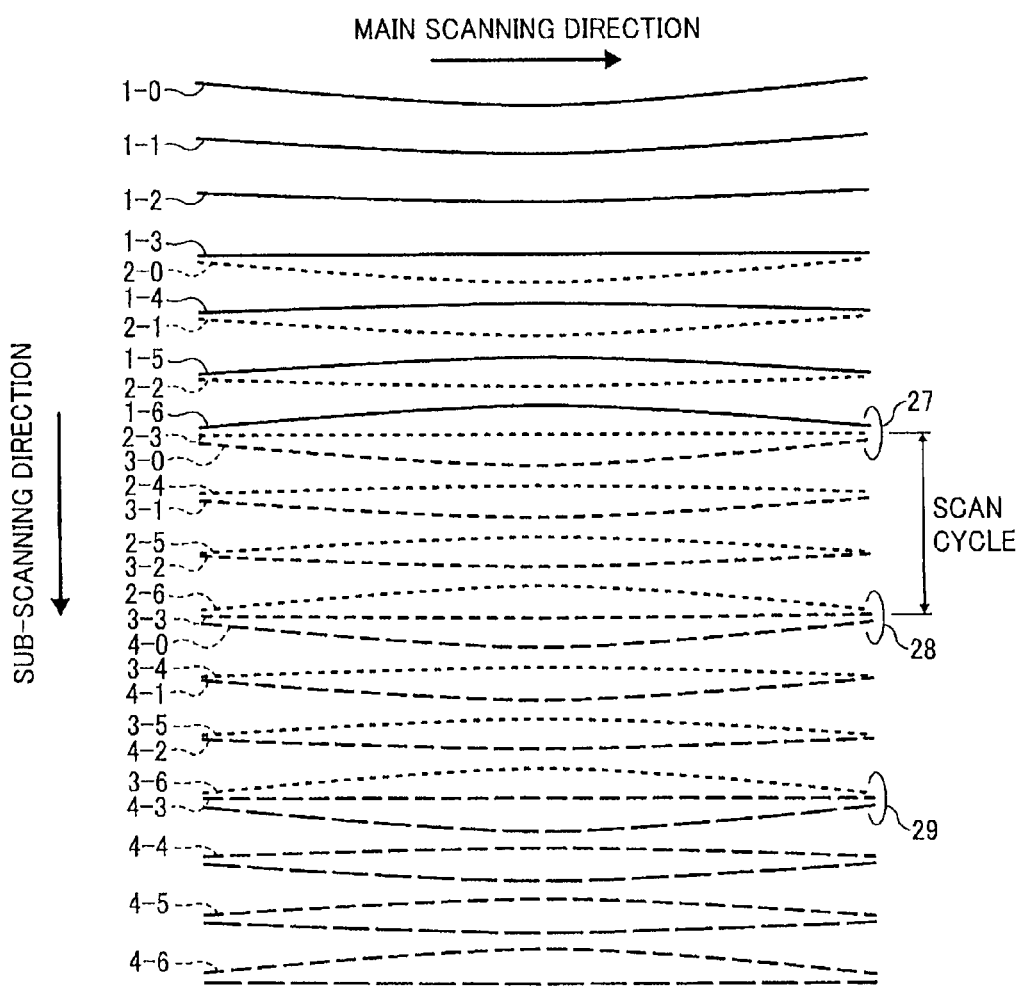
FIG. 5 illustrates an exemplary relation between scanning lines formed when overlap scanning of skipping one scanning line is executed in a condition as shown in FIG. 4.

From the above, it is understood that excessive concentration sections 27 to 29 caused by scanning line bending appear at a feed interval equivalent to a number of lines simultaneously scanned (e.g. seven in FIG. 5).

Further, a scanning line interval is D−6ε (=D−2Nε) in a narrow section and is D+8ε[=D+2 (N+1)ε] in a wide section each at the right side end of scanning lines subsequent to the scanning line 1-3, wherein D represents a proper scanning line interval (e.g., D=42.3 micrometer in a case of 600 dpi). Especially, the scanning line interval D−6ε is repeated twice in the excessive concentration sections 27 to 29.

Occurrence of uneven density due to interference of overlap scanning with these scanning line bending do not matter when a few beams are simultaneously scanned. However, when a number of simultaneous scanning N is not less than 20 (e.g. N=20 to 40), even an optical system having a level (ε=0.1 μm), Nε becomes a few micrometer order, and unevenness of the scanning lines is prominent. In particular, a cycle of generation of unevenness of scanning line density DN increases to 0.4 to 0.8 mm, thereby becoming a large space frequency band largely visually affecting an image quality.

These phenomena keeps banding at a feed interval of scanning line group in an apparatus employing a large number N of simultaneous scanning even the above-mentioned reciprocity failure is reduced using the above-mentioned overlap scanning.

However, by appropriately using a mutual relation of scanning line bendings in the overlap scanning as shown in FIG. 5 and executing correction of averaging as to neighboring scanning lines as a pair, the above-mentioned problem can be resolved.

Hereinbelow, a method of achieving the above-mentioned correction is described with reference to FIG. 6, in which an exemplary method of executing overlap scanning using a laser beam array having twenty channels, but not limited to, is described. As shown, a beam spot at a cc-channel in n time scanning is represented by n-cc.

For example, twenty beam spots created in the first scanning are represented by circles from 1-00 to 1-19. Twenty beam spots created in the second scanning are represented by circles from 2-00 to 2-19. Beam spots created thereafter are similarly represented.

These respective beam spots n-00 to n-19 are constituted by a group A from n-00 to n-09 and that of B from n-10 to n-19, each arranged in the sub scanning direction at the same interval D. An interval between the groups A and B (i.e., D+δ) is slightly wider than the interval D, wherein the following inequality is met:

$$0 \leq \delta \leq D.$$

Figure 2:
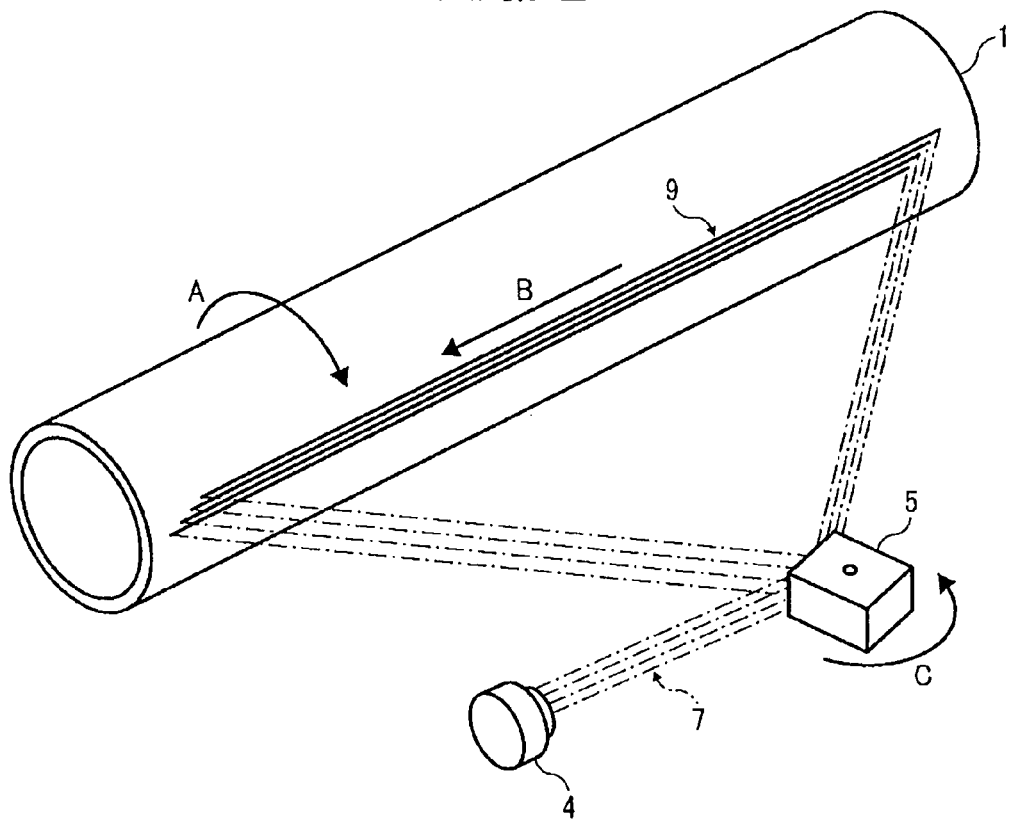
FIG. 2 is a conceptual diagram illustrating an exemplary scanning optical system applied to the image forming apparatus.

These beam spots are scanned in the main scanning direction by rotation of the polygon mirror 5 as shown in FIG. 2. Scanning is repeated subsequently such that the second scanning is executed after completion of the first scanning, and the third one is executed after completion of the second scanning.

Figure 6:
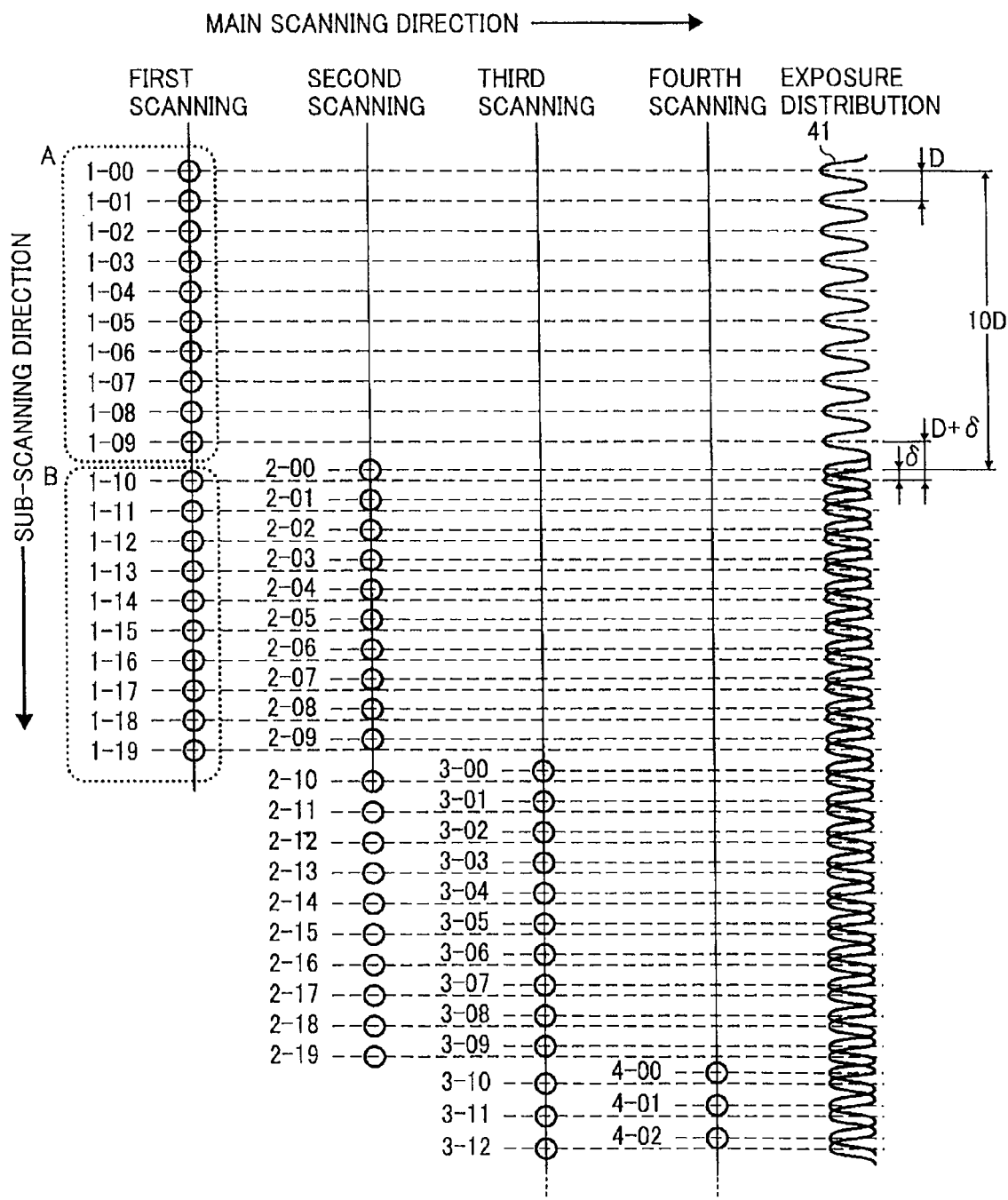
FIG. 6 is conceptual diagram illustrating an exemplary overlap scanning method using a laser beam array having twenty channels according to one embodiment of the present invention.

Now, an exemplary simultaneous scanning system is described in detail with ref to FIG. 6, wherein a feed pitch for feeding the beam spot groups A and B in the sub scanning direction is 10D. In general, a feed pitch in the sub scanning direction is ND when a number of lines simultaneously scanned is 2N. Although the main scanning positions of respective scannings are displaced in the drawing for the purpose of easy understanding, a practical feed pitch in the main scanning direction is zero.

Thus, respective scanning lines of the group B in the first scanning and those of the group A in the second scanning overlap with each other with a displacement of the interval δ. At this moment, exposure distributions 41 are superimposed there as shown in the drawing. By regarding the neighboring scanning lines as a pair being combined as one scanning line, and changing a distribution of exposure intensity (exposure energy) of these neighboring scanning lines, a position of the scanning line can be adjusted by a width δ at most in the sub scanning direction. Hereinafter, the pair of neighboring scanning lines is simply called as a scanning line pair.

The scanning line 1-10 is in a line state while the scanning line 2-00 is in an arch state each because of the performance of the optical system as described later with ref to FIG. 12. As mentioned later in more detail, the above-mentioned scanning line bending (i.e. arch) is corrected by designating an exposure intensity of the scanning line 1-10 larger and that of the scanning line 2-00 smaller at both ends in the main scanning direction, respectively, while reversely designating those at respective centers. As a result, a scanning line bending that generally occurs when a single scanning line 2-00 is used can be corrected.

Further, in a zone of the scanning lines from 1-00 to 1-09, they are not overlapped each other, and accordingly, the scanning line pair is not constituted. Thus, an image is practically outputted only from a start position where the scanning lines 1-10 and 2-00 overlap with each other, because a light beam is not practically turned on in the zone of the scanning lines 1-00 to 1-09. Specifically, since the light beam is not practically turned on in the zone, the image is not outputted there.

Figure 7:
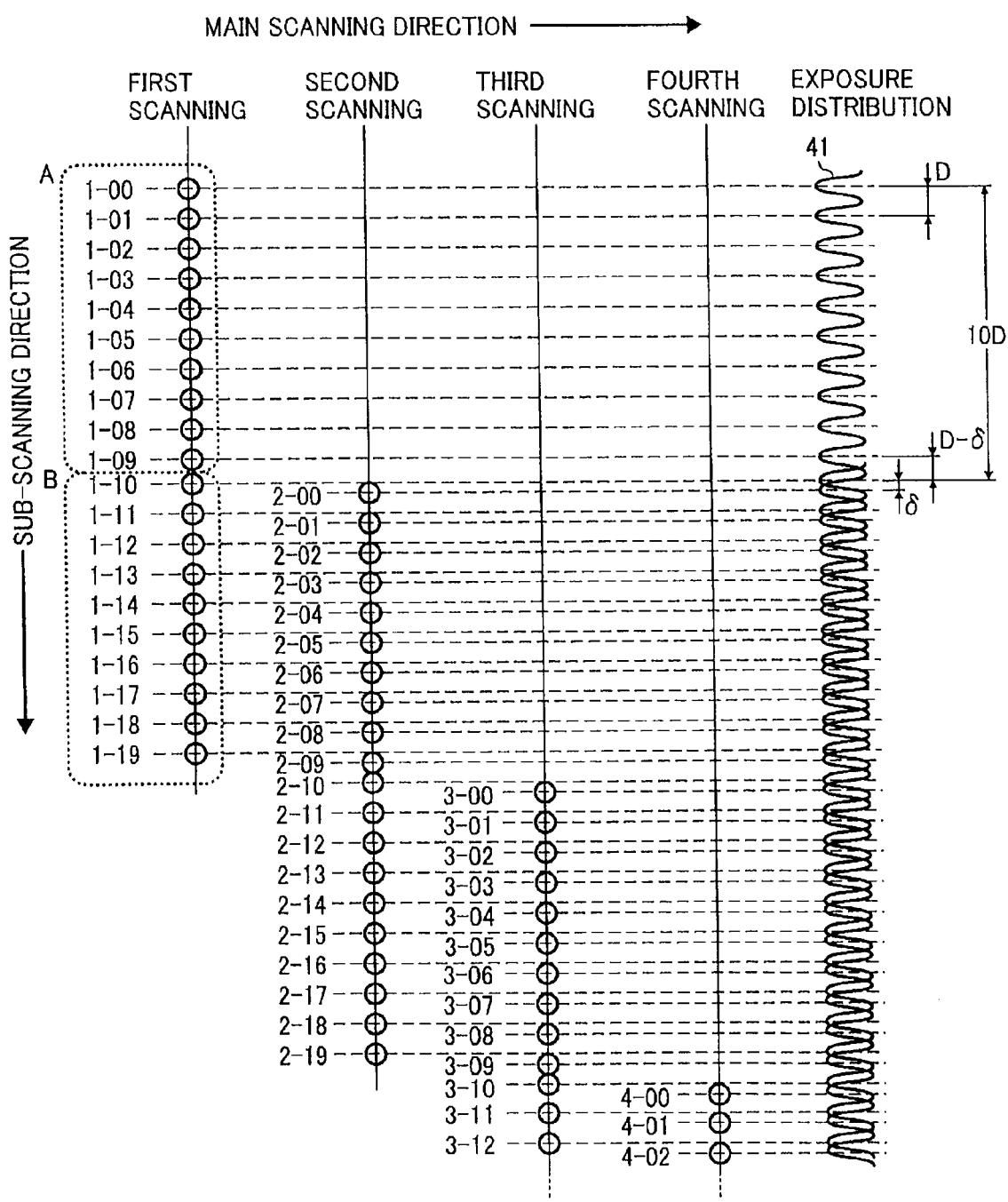
FIG. 7 is conceptual diagram illustrating another exemplary overlap scanning method using a laser beam array having twenty channels according to one embodiment of the present invention.

The above-mentioned interval between the groups A and B can be D−δ instead of D+δ, as shown in FIG. 7.

Also in FIG. 7, in a zone where the scanning line pair is not created, the light beam is neither practically turned nor the image is outputted. Specifically, an image is practically outputted from a start position where the scanning lines 1-10 and 2-00 overlap each other. Specifically, a light is not practically turned on in the zone of the scanning lines 1-00 to 1-09.

However, since the interval D tends to be designed in almost minimum allowable level when the groups A and B are aligned on an edge emission type LDA, the interval between the groups A and B is preferably practically D+δ.

Figure 8:
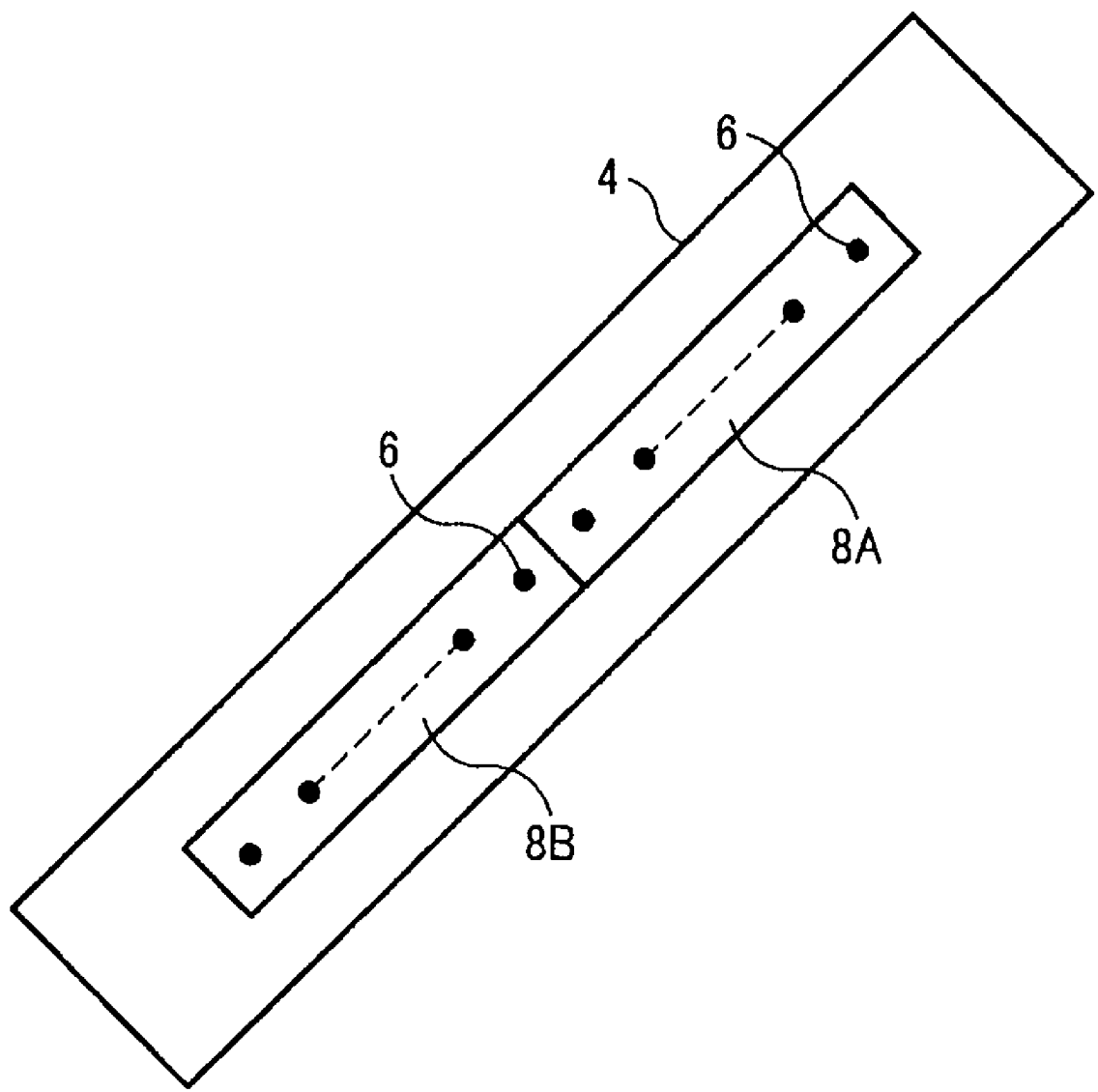
FIG. 8 is an enlarged plan view illustrating an exemplary LDA applied to this embodiment of the present invention.

Further, as shown in FIG. 8, a LDA is provided into two LDA devices 8A and 8B as groups A and B, respectively, to realize both of the scanning systems of FIGS. 6 and 7.

In both cases of FIGS. 6 and 7, a feed pitch (e.g., 10D) finally needed for resolution in the sub scanning direction is not changed. For example, when the image forming apparatus has a resolution of 600 dpi, the conditions are as follows:

D=42.3 micrometer, and

Feed Pitch=0.423 mm.

Figure 3:
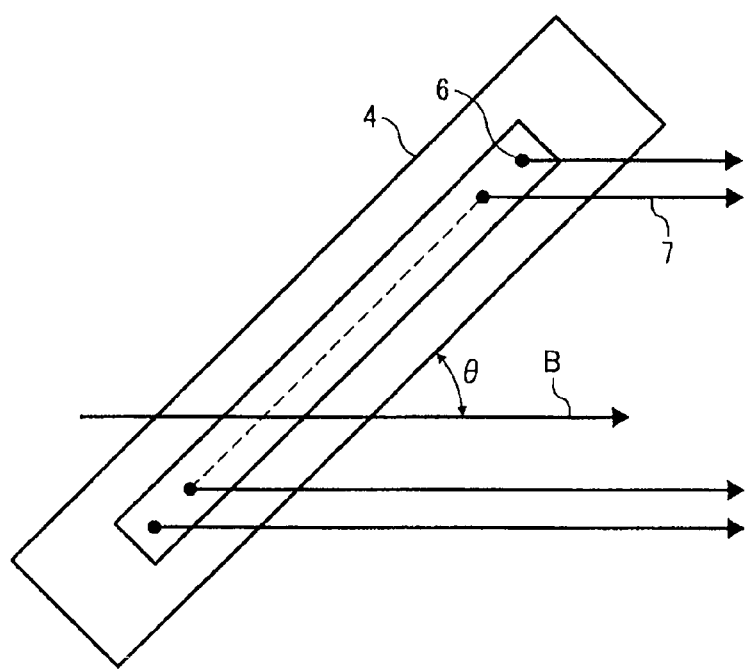
FIG. 3 is an enlarged plan view illustrating an exemplary LDA applied in this embodiment of the present invention.

The reason for employing the interval δ is to avoid occurrence of banding in a scanning line feed pitch cycle. For example, when the scanning line bending occurs as described with ref to FIG. 3. Since δ is zero (δ=0) in the vicinity of scanning lines 2-09 and 2-10, the interval between the scanning lines 2-09 and 2-10 is D as same as other intervals.

However, since the scanning line 1-19 is bent toward the scanning line 3-100 at its both ends, and the scanning line 3-00 is bent toward the scanning line 1-19 at its both ends, the banding unavoidably occurs at the ends in the vicinity of the scanning lines. Thus, the interval δ meeting the following inequality should be provided:

$$\delta > 0.$$

However, if adjustment of exposure intensity distribution is possible for the scanning lines 1-19 and 2-09, and those 2-10 and 3-00, a priority is drastically given to the scanning lines 2-09 and 2-10 to suppress banding. In this situation, the interval is zero (i.e., δ=0). It is the same in the example of FIG. 7.

Now, an other example of intermittently making scanning line pairs using three-time simultaneous scanning (overlap scanning) is described with reference to FIG. 9A. As shown, twenty laser beams that executes simultaneous scanning are divided into groups A to C having seven channels of n-00 to n-06, six channels of n-07 to n-12, and seven channels of n-13 to n-19, respectively.

A scanning line interval in each of the groups A to C is 2D, and an interval between scanning lines n-06 and n-07, and that between scanning lines n-12 and n-13 each serving as a group interval are 2D+δ/2, wherein the following inequality is met;

$$0 \leq \delta \leq D.$$

A feed pitch in the sub scanning direction per scanning is constantly 13D. For the purpose of ease, the feed pitch in the main scanning direction is displaced per simultaneous scanning in FIG. 9A, but is practically zero practically.

Thus, the group C of the first scanning and the group A of the third scanning are combined and make seven scanning line pairs. As a result, a scanning line group 46 of totally thirteen scanning lines are formed including the group B of the second scanning lines entering intervals between each of seven scan line pairs as shown. Accordingly, the scanning lines of the group B have standard exposure intensity supposing that it solely executes development. Whereas those of the groups A and C have exposure intensity distributions capable of correcting scanning line bending and collectively equivalent to the standard intensity. Such standard exposure intensity represents an exposure level supposed to be able to execute image formation without making the scanning line pair (i.e. a not combined scanning line).

Figure 9A:
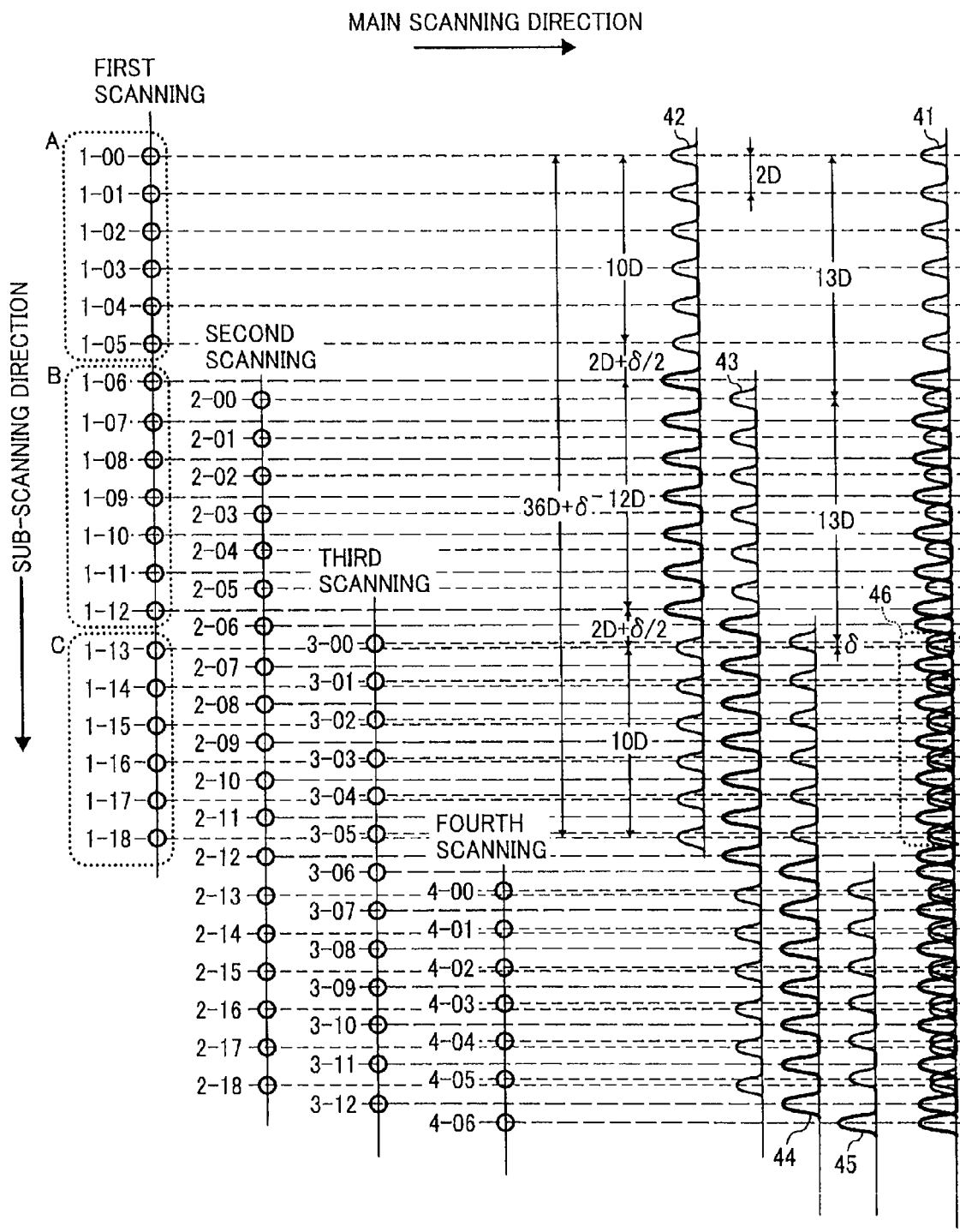
FIGS. 9A and 9B are conceptual diagrams each illustrating another exemplary overlap scanning method using a laser beam array having twenty channels according to one embodiment of the present invention.

An exemplary exposure distribution curvature is shown in FIG. 9A. Specifically, exposure distributions 42 to 45 correspond to first to fourth scannings, respectively, and their superimposition is represented by the exposure distribution 41.

In a normal optical system, scanning lines in the groups n-00 to n-19 symmetrically bend about a central scanning line (i.e., n-09 or n-10) as shown in FIG. 5, and displacement in the sub scanning direction becomes larger toward the scanning line group ends n-00 and n-19. Thus, when the bending of the group B is negligible, sufficient scanning line correction can be obtained even by the system of FIG. 9A. In particular, since a number of scanning lines to be overlapped decreases than the cases of FIGS. 6 and 7, the number of valid scanning lines can advantageously be increased by about 30% per simultaneous scanning.

In general, scanning line pairs can be made by three time scannings as sown in FIG. 9A, if the total beam number is coprim, such as three, etc. For example, when the total number of beams N equals to 3M+1 (i.e. N=3M+1), a number of beams of the groups A and C are preferably M and M+1, respectively, while a feed pitch is 2M+1. When the total beam number N equals to 3M+2 (i.e. N=3M+2), each of numbers of beams of the groups A and C is preferably M+1, while a feed pitch is 2M. Thus, the example of FIG. 9A corresponds to the case of N=20 and M=6. When the beam number N is 40 (i.e. N=40), M is 13 (i.e. M=13) and numbers of beams of the groups A to C are 13, 14, and 13, respectively, while a feed pitch is 27.

Further, since the zone of the scanning lines 1-00 to 1-06 do not make the scan line pair as mentioned above, the light is not practically turned on, because the scanning line is only created by the three scanning lines in this embodiment. Specifically, the light is not practically turned on where the scanning lines 1-07 to 1-12 and those 2-00 to 2-06 are combined. As a result, since the light is not practically turned on in these zones, the image is not outputted. Thus, the image is practically outputted from a start position where the scanning lines 1-13, 2-07, and 3-00 overlap each other.

Now, an exemplary principle of correcting a scanning line position in the sub scanning direction by means of the exposure intensity distribution in a scanning line pair is described with reference to FIGS. 10A and 10B. FIG. 10A illustrates an exemplary exposure distribution in scanning lines created in accordance with exposure intensity distribution shown in a table of FIG. 10B.

The lateral axis of FIG. 10A represents a position x of a scanning line in the sub scanning direction. The curvature A relatively represents energy distribution regarding the maximum level being one when single beam exposure is executed at a position (x=0). The curvature B relatively represents energy distribution when single beam exposure is execute at another position x (x=10.6 micrometer). Curvatures indicated by numbers 1 to 7 represent energy distributions obtained by combining the curvatures A and B using liner addition calculation with coefficients of the exposure intensity shown in the table of FIG. 10B. FIG. 11 illustrates a range where of the curvature of the numbers 1 to 7 exceeds the threshold $1/e^2$.

The numbers 1 to 7 of FIG. 11 correspond to those assigned to the exposure intensity distribution in FIG. 10. The vertical axis represents a beam position. Each of line segments indicated above the numbers 1 to 7 represents a range where a curvature of corresponding exposure intensity distribution of FIG. 10A exceeds a prescribed threshold. Each of central points of the line segments represents a central position.

A number of regions where exposure intensity distribution is executed is not limited to the above.

Thus, it is understood that when development is executed with the threshold $1/e^2$ and the exposure intensity distribution of FIG. 10A is used, a scanning line can be deviated by a unit of about 1.8 micrometer (=10.6 μm/6) in the sub scanning direction while maintaining a uniform line width (e.g. 60 micrometer in this embodiment).

Now, an exemplary correction is specifically described with reference to FIG. 12. FIG. 12 is a conceptual diagram illustrating a scanning line pair including a beam (1-10) of first scanning 10 channels and a beam (2-00) of second scanning 00 channels as shown in FIG. 5.

Figures 12, 13:
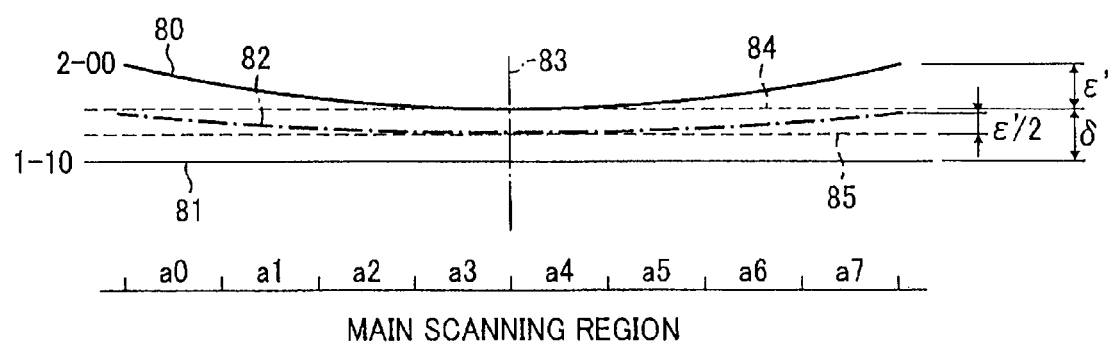
FIG. 12 is a chart illustrating an exemplary correction of scanning line bending according to one embodiment of the present invention.
FIG. 13 is a chart illustrating an exemplary exposure intensity distribution per main scanning region when correction is made in an example of FIG. 12.

Since the scanning line 81 of the beam 1-10 has a relatively high straight-line performance due to being positioned adjacent to the center of the LDA, it is simply illustrated as a straight line in FIG. 12. In contrast, the scanning line 80 of the beam 2-00 has the worst straight-line performance due to a beam at the end of the LDA. In particular, FIG. 12 illustrates a scanning line 80 including an error of expanding like the bobbin at its both ends.

When the exposure intensity of the beam 2-00 is the same as the beam 1-10, a scanning line latent image obtained by combining the scanning lines 80 and 81 becomes an average scanning line 82 as shown by a dotted line. Only owing to this, the maximum error of the average scanning line 82 from a target scanning line 85 is ½ (i.e., $\epsilon'/2$) in comparison with the maximum error $\epsilon'$ of the scanning line 80 from an ideal orbit 84.

Further, by diving the whole scanning line width into eight scanning line regions a0 to a7 and adjusting a ratio of the exposure intensity distribution in the light beams 1-10 and 2-00 per scanning line region, the error of the average scanning line 82 from the target scanning line 85 can be improved to be about ⅙ (i.e., $\epsilon'/6$).

The ratio of the exposure intensity distribution can be obtained as follows. For example, in the scanning line region a0, a ratio of the interval between the scanning line 81 and the target scanning line 82 to the interval between the scanning line 81 and the average scanning line 85 is from about 0.5 to about 0.3. When the interval between the scanning line pair is about 10 micrometer, since it is know that the center can be displaced by about ⅓ by combining the curvature of number 5 in the intensity distribution table of FIG. 10, coefficients 0.29 and 0.58 of the exposure intensity are assigned to the beams 2-00 and 1-10, respectively, in the scanning line region a0, to shift the average scanning line 82 toward the scanning line 81 by about ⅓.

When the higher exposure intensity distribution such as 0.58 is assigned to the ends of the beam 1-10, and the lower exposure intensity distribution such as 0.29 is assigned to the ends of the beam 2-00 (i.e. regions a0, a1, a6, and a7), while intensity distributions are oppositely assigned to their centers (i.e. regions a2 to a5) as shown in FIG. 13, the scanning line bending occurring when only the beam 2-00 is used can be corrected. The above-mentioned exposure intensity distribution value (e.g. FIG. 10B) and the number of division of the scan regions (e.g. eight of a0 to a7) are typically determined in view of a balance between operation easiness and effectiveness. Thus, if more fine adjustment is needed, a number of tables as shown in FIG. 10B is increased and the scan region can more finely be divided.

Figures 14, 15:
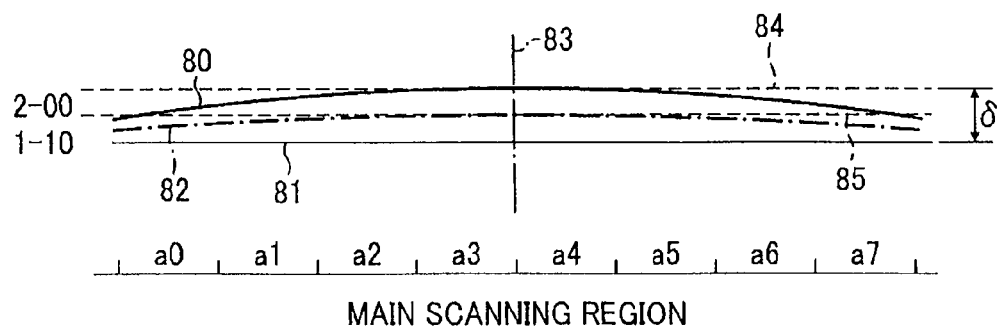
FIG. 14 is a chart illustrating an exemplary correction of scanning line bending according to one embodiment of the present invention.
FIG. 15 is a chart illustrating an exemplary exposure intensity distribution per main scanning region when correction is made in an example of FIG. 14.

A second exemplary system of correcting the beams 2-00 and 1-10 deforming like a barrel is described with reference to FIG. 14. Specifically, by setting high exposure intensity to both ends of the beam 2-00 and setting low exposure intensity to both ends the beam 1-10 (i.e. regions a0 to a2 and a5 to a7), while setting the same exposure intensity to centers of the light beams (i.e. regions a3 and a4) as shown in FIG. 15, the scanning line bending appearing when the beam 2-00 is singularly used can be corrected.

Further, exposure intensities 1.00 and 0.00 are assigned to the main scan regions a0 and a7 of the beams 2-00 and 1-10, respectively, those of 0.77 and 0.15 are assigned to in the main scan regions a1 and a6 of the beams 2-00 and 1-10, respectively, those of 0.58 and 0.29 are assigned to the main scan regions a2 and a5 of the beams 2-00 and 1-10, respectively, and that of 0.43 is commonly assigned to the main scan regions a3 and a4 of the beams 2-00 and 1-10. The above-mentioned exposure intensity distribution is similarly considered.

Another exemplary system of correcting high order deformation of the beams 2-00 and 1-10 is now described with reference to FIG. 16. As shown, the scanning line of the beam 1-10 is a line state. Whereas, the beam 2-00 is waved. The beam 2-00 approaches to the beam 1-10 at the main scanning regions a0 and a5. The beam 2-00 is bent and is distant from the beam 1-10 at the main scanning regions a2 and a7. Correction to such scanning line bending can be similarly achieved by executing exposure intensity distribution as mentioned above.

Specifically, exposure intensity of the beam 2-00 is set to be higher than the beam 1-10 at the main scanning regions a0 and a5, while the former is set to be lower than the latter at the main scanning regions a2 and a7. More specifically, the exposure intensity of the beam 1-10 is 0.29, 0.43, 0.58, 0.43, 0.43, 0.29, 0.43, and 0.58 at the regions a0 to a7, respectively. Whereas the exposure intensity of the beam 2-00 is 0.58, 0.43, 0.29, 0.43, 0.43, 0.58, 0.43, and 0.29 at the regions a0 to a7, respectively.

Figures 16, 17:
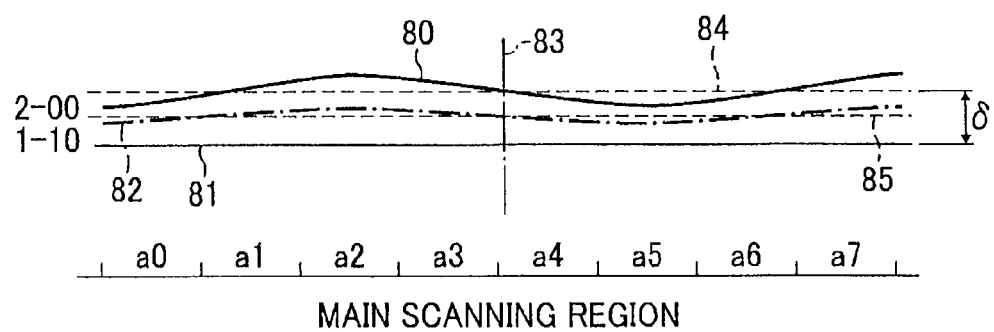
FIG. 16 is a chart illustrating another exemplary correction of scanning line bending according to one embodiment of the present invention.
FIG. 17 is a chart illustrating an exemplary exposure intensity distribution per main scanning region when correction is made in an example of FIG. 16.

Such exposure intensity distribution per scanning region is described in FIG. 17. For the purpose of easily handling more complicated deformation distribution, a divisional position is changeable so that the main scanning region can be divided at uneven interval. Beside, the scanning line bending having higher order deformation can similarly be corrected.

Further, three neighboring scanning lines can create a scanning line combination, and the above-mentioned exposure intensity distribution is similarly employed.

Heretofore, only a scanning line pair is typically mentioned for the purpose of simplification, the exposure intensity distribution is practically used in all of beams scanned simultaneously per scanning line region. Since a combination of beam channels constituting the scanning line combination is always fixed, inconsistency does not occur among them.

Figure 18:
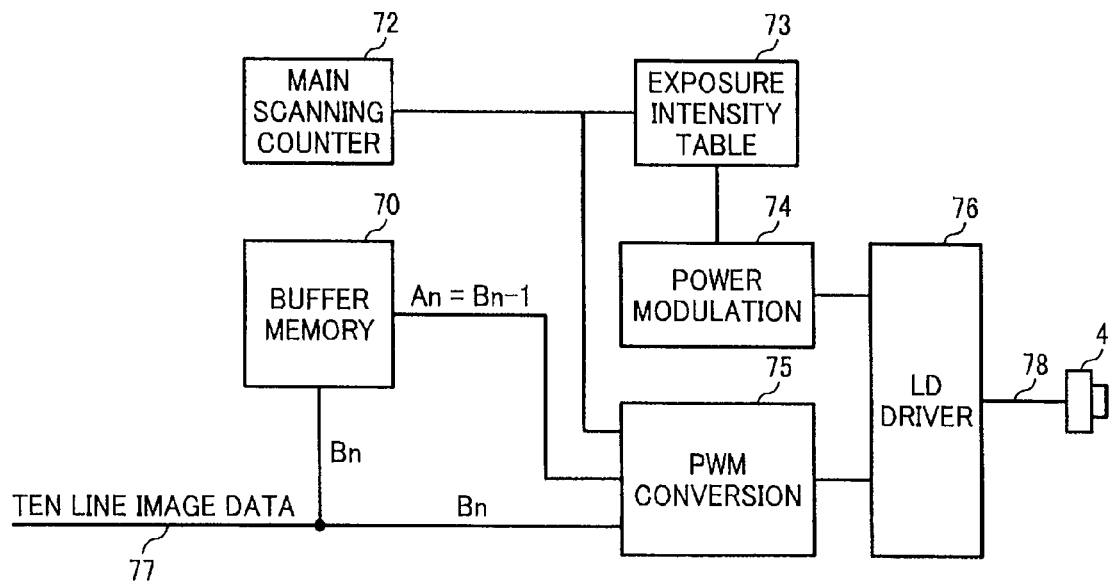
FIG. 18 is a chart illustrating an outline of exemplary signal processing executed when a pair of scanning lines is made by a twice-scanning system according to one embodiment of the present invention.

An outline signal processing handling a scanning line pair system that executes twice scanning as illustrated in FIGS. 6 and 7 is now described with reference to FIG. 18.

Input image data 77 includes image data of a ten line transmitted from a page memory as a bit map, in which image data spreads, in synchronism with a scan cycle. A buffer memory 70 maintains the ten line data and delivers ten line data previously stored therein to a PMW conversion device 75.

The PMW conversion device 75 applies PMW conversion (i.e. pulse width modulation) to data of twenty line as the sum of the ten line data from the buffer memory 70 (corresponding to the group A in FIG. 6) and that of the input image data 77 (corresponding to the group B in FIG. 6), and then transmits the resultant data to a LD driver 76 for driving a light emission element (e.g. a LD) having the twenty channels.

An exposure intensity table 73 maintains exposure intensity distribution coefficients corresponding to values listed on the table of FIG. 10B and main scan counter values representing main scanning positions associated with the exposure intensity distribution coefficients per LD channel. The exposure intensity table 73 transmits the exposure intensity distribution coefficients of the twenty channels to a power modulation device 74 in accordance with a count value transmitted from a main scan counter 72.

A LD driver 76 generates a LDA drive signal 78 for driving a LDA 4 of twenty channels from a signal pattern transmitted from the PMW conversion device 75 in accordance with the exposure intensity determined by the power modulation device 74.

The exposure intensity table 73 assigns exposure intensity distribution coefficients corresponding to those in FIG. 10 in accordance with the main scanning line position for a pair of channels serving as a scanning line pair. Since the coefficient for exposure intensity distribution is practically affected by performances of a photoconductive member or a toner or the like, optimum values are obtained through experience. Thus, the LDA drive signal 78 is generated to execute each of the scannings as shown in FIGS. 6 and 7.

Figure 19:
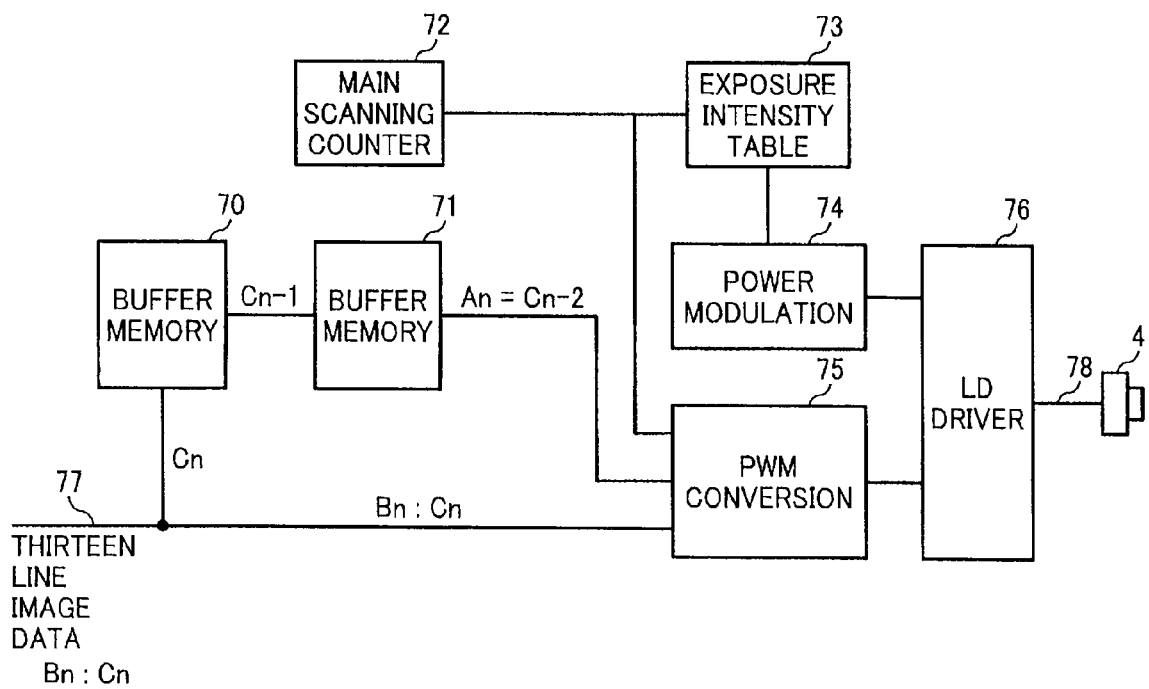
FIG. 19 is a chart illustrating an outline of exemplary signal processing executed when a pair of scanning lines is made by a three times scanning system according to another embodiment of the present invention.

Now, exemplary signal processing for the three time scanning system of FIG. 9A is briefly described with reference to FIG. 19.

Image data 77 includes data of a thirteen lines transmitted at once in synchronism with a scan cycle from a page memory as a bit map, not shown, in which image data spreads. A buffer memory 70 maintains seven line data of the latter part of the thirteen lines and delivers another seven line data previously stored therein to the next buffer memory 71. The buffer memory 71 maintains the seven line data transmitted from the buffer memory 70 and delivers another seven line data previously stored therein to the PMW conversion device 75.

A PMW conversion device 75 applies PMW conversion to data of twenty line amount as the sum of the seven line data transmitted from the buffer memory 71 (corresponding to the group A of FIG. 9A) and that of the input image data 77 (corresponding to the groups B and C of FIG. 9A), and then transmits the resultant data to a LD driver 76 for driving the light emission elements (e.g. a LD) of the twenty channels.

An exposure intensity table 73 maintains exposure intensity distribution coefficients corresponding to values listed on the table of FIG. 10B and main scanning counter values representing main scanning positions associated with the exposure intensity distribution coefficients per LD channel. The exposure intensity table 73 then transmits exposure intensity distribution coefficients of the twenty channels to a power modulation device 74 in accordance with a counter value transmitted from the main scan counter 72.

The LD driver 76 generates a LDA drive signal 78 for driving a LDA 4 of twenty channels from a signal pattern transmitted from the PMW conversion device 75 in accordance with the exposure intensity determined by the power modulation device 74.

Figure 9B:
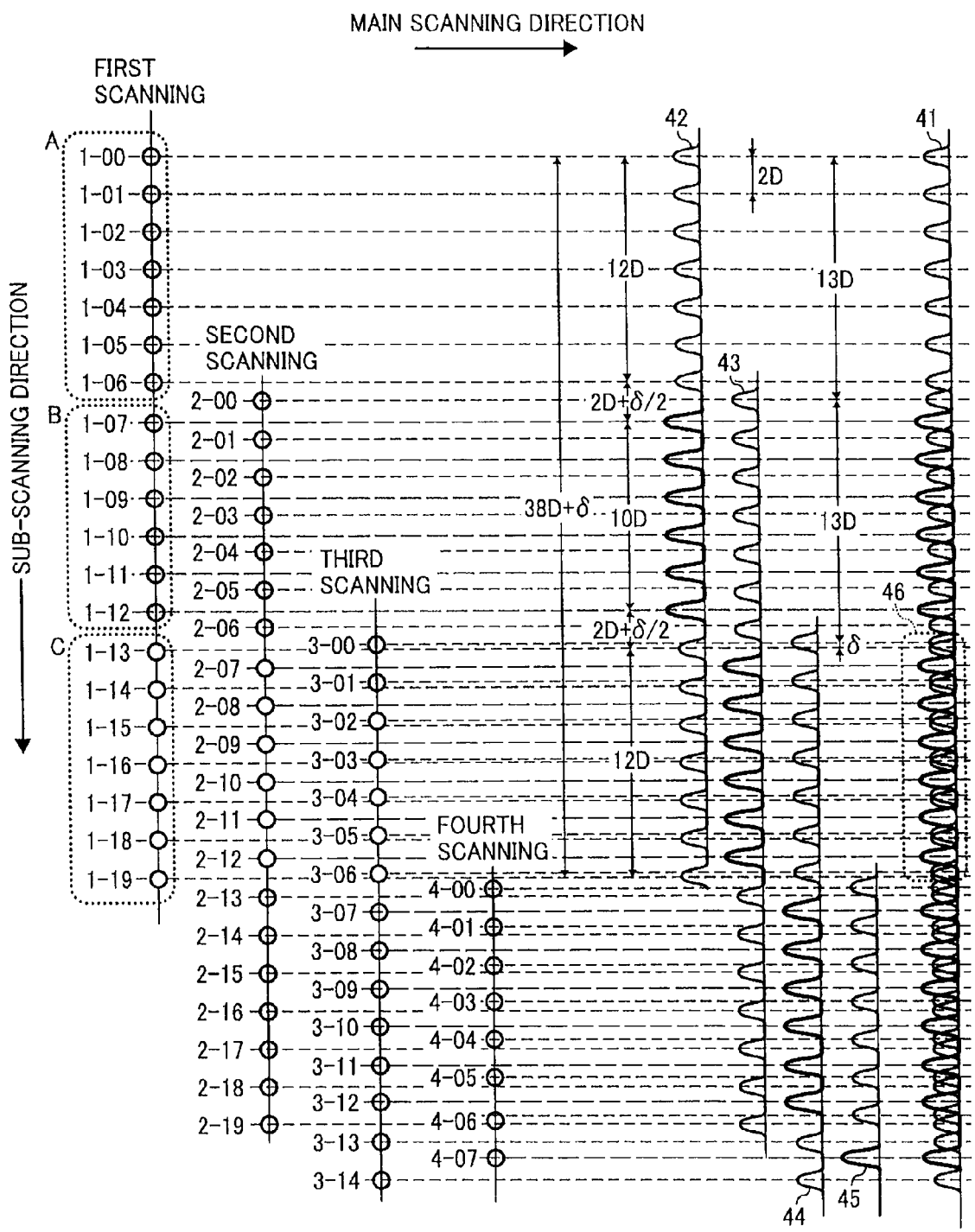

The exposure intensity table 73 assigns exposure intensity distribution coefficients of FIG. 10B in accordance with the main scanning line positions in a pair of channels serving as a scanning line pair. However, as mentioned above, since the coefficients of exposure intensity distribution practically affected by performances of a photoconductive member and a toner or the like, optimum coefficients are obtained through experience previously. With such configuration, the LDA drive signals 78 are generated to execute each of scannings as shown in FIG. 9A. A scanning method as shown in FIG. 9B is similarly implemented as in the FIG. 9A except for using a different number of beam spots (i.e., scanning lines) in each of groups A to C (e.g. N, N+1, and N).

Now, a modification of the above-mentioned embodiment is described. When a LDA is produced by arranging light sources of plural end face light emission lasers, a high power output and a stable light output waveform can be readily obtained. However, a laser threshold current becomes high and power is increasingly consumed as a number of light sources increases. Further, since the light sources are aligned in one dimension in the LDA, aberration occurring in the optical system need be compensated by all of beams as a problem.

Then, still another modification is described. As a light source using plural laser beams, a surface light generation laser (VCSEL: Vertical cavity surface Emitted Laser) capable of mounting within a surface of a monolithic semiconductor at high density is used.

This surface light generation laser has a low threshold current and is capable of saving power. Thus, a laser drive apparatus can be downsized at low cost. Further, since heat generation from the surface light generation laser or a laser drive apparatus is suppressed to be a low level, stable driving is obtained.

Further, two-dimensional arrangement is readily executed, so that the light source can be mounted at high density, and accordingly, deviation of an optical axis from the optical system is small. Thus, it is advantageous in view of aberration in the scanning optical system, and a beam spot position and a radius of the beam can be stable.

Figure 20:
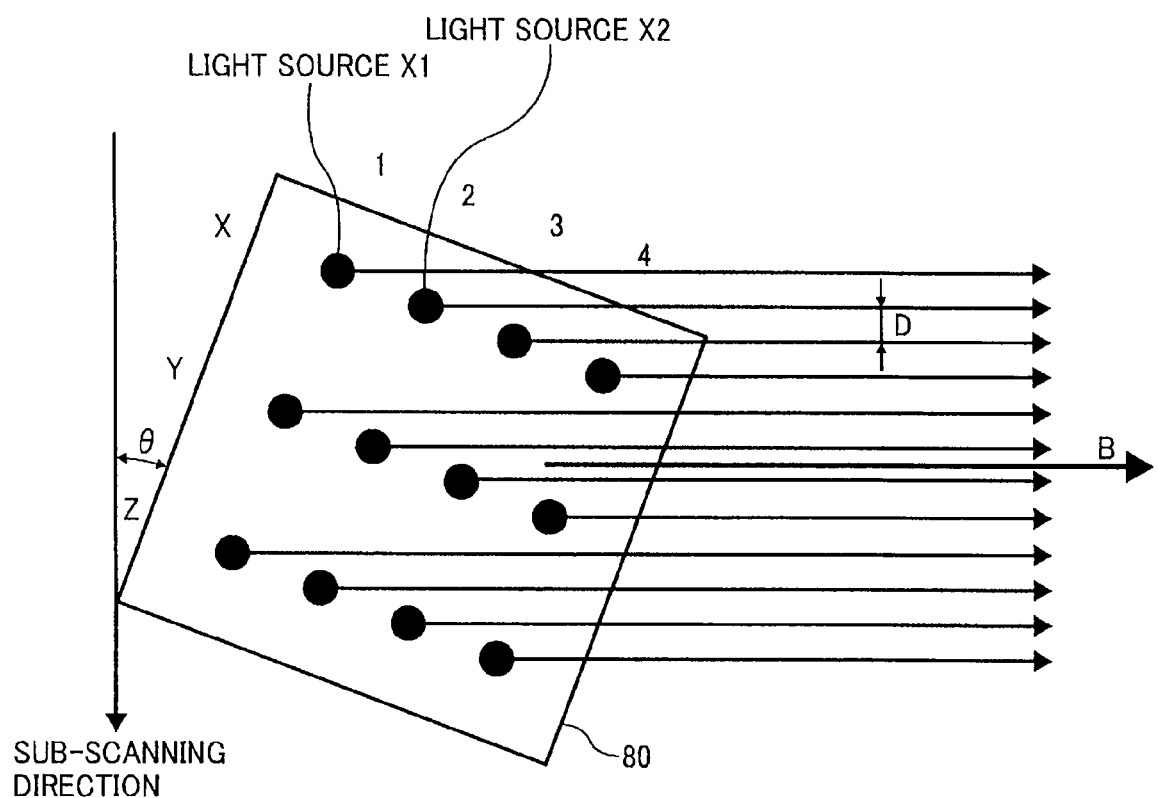
FIG. 20 is an enlarged plan view illustrating an exemplary surface light generation laser unit applied to another embodiment of the present invention.

Now, an example of using a surface light generation laser is described with reference to FIG. 20, in which longitudinal and horizontal alignment directions of a surface light generation laser unit 80 as a light source are represented as X, Y, Z, . . . and 1, 2, 3, 4, . . . , respectively. Thus, a light source of the left upper side in the drawing is defined as X1, and a light source neighboring to the X1 on the right side thereof on in the same longitudinal alignment is defined as X2. However, such a number of light sources is not limited thereto.

As shown, by inclining the surface light generation laser unit 80 at an angle θ from the sub scanning direction B, each of scan intervals between light sources X1, X2, . . . is D, and writing of exposure is performed in the main scan direction (i.e. the direction B). Thus, a latent image with the scan interval is formed on the photoconductive member drum 1. The scanning and driving of the light source using exposure intensity distribution, etc., are similarly executed as mentioned above.

The present invention is preferably employed in a scan type electrophotographic system, such as a laser printer, a laser copier, etc., using a polygon mirror, and in particular, in an image forming apparatus simultaneously executing beam scanning with plural number of laser beams such as more than twenty.

Obviously, numerous additional modifications and variations of the present invention are possible in light of the above teachings. It is therefore to be understood that within the scope of the appended claims, the present invention may be practiced otherwise than as specifically described herein.

ADVANTAGE

According to the various embodiments, reciprocity failure owing to the overlap scanning can be reduced and generation of the banding due to interference caused by scanning line bending having a trade off relation to decreasing of the reciprocity failure can be prevented while maintaining advantage obtainable by increasing a number of scanning lines when multi beam scanning is executed. Further, the image forming apparatus capable of executing high-speed depiction can be provided.

What is claimed is:

1. An image forming apparatus comprising:
   a photoconductive member;
   a charger configured to charge a surface of the photoconductive member;
   a laser light source configured to emit at least two laser beams at once;
   an optical scanning system configured to simultaneously form a group of at least two scanning lines extending in a main scanning direction on the surface of the photoconductive member, each of said at least two scanning lines being formed at a prescribed scan line interval in a sub scanning direction;
   a scan controller configured to control the laser light source to repeatedly emit the at least two laser beams at different times; and
   an exposure intensity distribution changing device configured to symmetrically change exposure intensity distribution of each of the at least two scanning lines in the main scan direction,
   wherein a group of at least two scanning lines formed next on the photoconductive member partially overlaps with a group previously formed with displacement of a prescribed feed pitch in the sub scanning direction, so that prescribed numbers of the at least two scanning lines of the different groups neighboring to each other are paired to form a prescribed number of combination scan lines, said combination scan lines constituting a latent image formed on the photoconductive member,
   wherein said exposure intensity distribution changing device substantially equalizes a sum of the exposure intensity of the pair of neighboring scan lines of the combination scan line at every section in the main scanning direction, and
   wherein said scan line interval is one of D+δ or D−δ at a center and D at the remaining sections of each of the at least two scanning lines and said prescribed feed pitch is ND when 2N represents a number of the scanning lines formed at once and the following inequality is met;

$0 \leq \delta \leq D$.

2. The image forming apparatus as claimed in claim 1, wherein said 2N number of the at least two scanning lines includes two sub groups each having N number of the at least two scanning lines;
   wherein N number of combination scanning lines are formed from at least two scanning lines of the different sub groups neighboring to each other when the next group is overlapped; and
   wherein said exposure intensity distribution changing device includes a register configured to switch the exposure intensity of each of the at least two scanning lines in accordance with a position in the main scanning direction.

3. The image forming apparatus as claimed in claim 2, wherein said laser light source includes a pair of laser diode arrays each integrally including light emitting elements having N channels.

* * * * *